US012669806B2

(12) United States Patent
Ojha et al.

(10) Patent No.: US 12,669,806 B2
(45) Date of Patent: Jun. 30, 2026

(54) SEQUENCING MECHANISM FOR SYSTEM ASSEMBLY

(71) Applicant: SAP SE, Walldorf (DE)

(72) Inventors: Ravish Kumar Ojha, Bangalore (IN);
Ramkumar Sethurao, Bangalore (IN);
Sanath Kumar K S, Bangalore (IN)

(73) Assignee: SAP SE, Walldorf (DE)

( * ) Notice: Subject to any disclaimer, the term of this patent is extended or adjusted under 35 U.S.C. 154(b) by 625 days.

(21) Appl. No.: 18/118,803

(22) Filed: Mar. 8, 2023

(65) Prior Publication Data

US 2024/0302821 A1 Sep. 12, 2024

(51) Int. Cl.
*G05B 19/418* (2006.01)

(52) U.S. Cl.
CPC ... *G05B 19/41805* (2013.01); *G05B 19/4184* (2013.01)

(58) Field of Classification Search
USPC .......................................................... 700/97
See application file for complete search history.

(56) References Cited

U.S. PATENT DOCUMENTS

| | | | | | |
|---|---|---|---|---|---|
| 3,931,612 | A | * | 1/1976 | Stevens | G06F 7/24 |
| 2002/0019780 | A1 | * | 2/2002 | Herman | G06Q 30/06 |
| | | | | | 705/26.8 |
| 2002/0099462 | A1 | * | 7/2002 | Gurrola-Gal | G06Q 10/04 |
| | | | | | 705/7.34 |
| 2003/0208418 | A1 | * | 11/2003 | Caputo | G06Q 10/087 |
| | | | | | 705/28 |
| 2004/0062372 | A1 | * | 4/2004 | Gilles | H04M 3/42 |
| | | | | | 705/26.1 |

| | | | | | |
|---|---|---|---|---|---|
| 2009/0276339 | A1 | * | 11/2009 | Low | G06Q 10/087 |
| | | | | | 705/29 |
| 2013/0279674 | A1 | * | 10/2013 | Gilles | G06Q 10/1097 |
| | | | | | 379/201.01 |
| 2015/0253767 | A1 | * | 9/2015 | Heinecke | G06Q 10/0631 |
| | | | | | 700/105 |

FOREIGN PATENT DOCUMENTS

| | | | | |
|---|---|---|---|---|
| WO | WO-0188816 | A1 | * 11/2001 | G06Q 50/04 |

OTHER PUBLICATIONS

Pawlewski et al. "Just in Sequence Delivery Improvement Based on FLEXSIM Simulation Experiment", IEEE, 2012, p. 1-12. (Year: 2012).*
Lorenc et al. "Customer Logistic Service in the Automotive Industry with the Use of the SAP ERP System", IEEE, 2015, p. 18-23. (Year: 2015).*
CN_104981823_B (Year: 2019).*
DE_102018121514_A1 (Year: 2020).*

* cited by examiner

*Primary Examiner* — Hien D Khuu
(74) *Attorney, Agent, or Firm* — Mintz Levin Cohn Ferris Glovsky and Popeo, P.C.

(57) ABSTRACT

A method, a system, and computer program product for managing delivery sequences are provided. A delivery sequence defining a delivery order for components is received. An assembly configuration of the customer defining an assembly sequence is retrieved. Threshold values from the assembly sequence are determined. Prefixes to entries of the delivery sequence are assigned based on a comparison of each entry of the entries of the delivery sequence to the threshold values. A formatted sequence of component identifiers is generated by using the prefixes. An execution of a delivery of the components to the customer is triggered according to the formatted sequence of component identifiers.

20 Claims, 5 Drawing Sheets

220

| Total Assembly Structure | | 001-999 | 234 | Assembly Phase Initials | 236 |
|---|---|---|---|---|---|
| Begin Range [BR] | 232 | 001-199 | | BR | |
| Mid Range [MR] | | 200-799 | | MR | |
| End Range [ER] | | 800-999 | | ER | |

| Delivery Sequence 222 | Assembly Phase 224 | Pre-fix to be assigned 226 | Reasoning 228 | Formatted Sequenced Number 230 |
|---|---|---|---|---|
| 001 | BR | 01 | Sequence belongs to Begin Range or Start of Production | 01001 |
| 002 | BR | 01 | Sequence belongs to Begin Range or Start of Production | 01002 |
| 003 | BR | 01 | Sequence belongs to Begin Range or Start of Production | 01003 |
| --- 004 to 990 | BR - MR – ER | 01 | Sequence belongs to Begin Range or Start of Production | 01XXX |
| 991 | ER | 01 | Sequence belongs to End Range or Start of Production | 01991 |
| 992 | ER | 01 | Sequence belongs to End Range or Start of Production | 01992 |
| 993 | ER | 01 | Sequence belongs to End Range or Start of Production | 01993 |
| 994 | ER | 01 | Sequence belongs to End Range or Start of Production | 01994 |
| 003 | BR | 02 | Sequence belongs to Begin Range or Start of Production | 02003 |
| 004 | BR | 02 | Sequence belongs to Begin Range or Start of Production | 02004 |
| 995 | ER | 01 | Sequence belongs to End Range of Previous Cycle | 01995 |
| 996 | ER | 01 | Sequence belongs to End Range of Previous Cycle | 01996 |
| 997 | ER | 01 | Sequence belongs to End Range of Previous Cycle | 01997 |
| 998 | ER | 01 | Sequence belongs to End Range of Previous Cycle | 01998 |
| 999 | ER | 01 | Sequence belongs to End Range of Previous Cycle | 01999 |
| 001 | BR | 02 | Sequence belongs to to Begin Range of Next Cycle | 02001 |
| 002 | BR | 02 | Sequence belongs to to Begin Range of Next Cycle | 02002 |
| 005 | BR | 02 | Sequence belongs to to Begin Range of Next Cycle | 02005 |
| 006 | BR | 02 | Sequence belongs to to Begin Range of Next Cycle | 02006 |

RECEIVE DELIVERY SEQUENCE — *302*

RETRIEVE ASSEMBLY CONFIGURATION — *304*

DETERMINE THRESHOLD VALUES — *306*

COMPARE SEQUENCE ENTRIES TO THRESHOLD VALUES — *308*

ASSIGN PREFIXES TO ENTRIES — *310*

GENERATE FORMATTED SEQUENCE NUMBER — *312*

EXECUTE DELIVERY OF COMPONENTS — *314*

RECEIVE DELIVERY NOTIFICATION — *316*

UPDATE SEQUENCE — *318*

UPDATE DELIVERY — *320*

SEQUENCING MECHANISM FOR SYSTEM ASSEMBLY

TECHNICAL FIELD

The present disclosure generally relates to system assembly management and, more specifically, to a sequence mechanism for system assembly.

BACKGROUND

In many industries, including the automotive industry, just-in-sequence material supply is a regularly followed practice. In the just-in-time process, the assembly sequence of vehicles is generally planned in advance by an original equipment manufacturer (OEM) and communicated to the suppliers. The committed sequence is essential for efficient operations both at the original equipment manufacturer and its suppliers. In practice, the sequence numbers sent by OEMs are not always in order and can fluctuate because of disruptions, such as quality issues, logistics, and missing parts, etc., which can put the sequencing of part delivery at risk. Such disruption can cause a high volume of workload for both OEMs and suppliers, making the system assembly inefficient.

SUMMARY

Methods, systems, and articles of manufacture, including computer program products, are provided for managing a sequence mechanism for system assembly. In one aspect, a computer-implemented method includes: receiving, by one or more processors, a delivery sequence including a plurality of component identifiers defining a delivery order for a plurality of components for a customer; retrieving, by the one or more processors, an assembly configuration of the customer, the assembly configuration defining an assembly sequence; determining, by the one or more processors, threshold values from the assembly sequence; assigning, by the one or more processors, prefixes to entries of the delivery sequence, the prefixes being assigned based on a comparison of each entry of the entries of the delivery sequence to the threshold values; generating, by the one or more processors, a formatted sequence of component identifiers by using the prefixes; and triggering, by the one or more processors, an execution of a delivery of the plurality of components to the customer according to the formatted sequence of component identifiers.

In some variations, one or more features disclosed herein including the following features can optionally be included in any feasible combination. In some implementations, the delivery sequence is generated based on a production sequence of a plurality of systems. In some implementations, the threshold values define transitions between time intervals corresponding to different assembly phases of the assembly sequence. In some implementations, the delivery sequence includes groups of components corresponding to different system types. In some implementations, the computer-implemented method further includes: monitoring an execution of the delivery to identify a disruption; and adjusting the formatted sequence of component identifiers to compensate for the disruption. In some implementations, the entries of the delivery sequence include one or more of an alphanumeric entry, a numeric entry, and a character representation. In some implementations, the entries of the delivery sequence are generated based on a configurable set of rules.

In another aspect, a non-transitory computer-readable storage medium includes programming code, which when executed by at least one data processor, causes operations including: receiving a delivery sequence including a plurality of component identifiers defining a delivery order for a plurality of components for a customer; retrieving an assembly configuration of the customer, the assembly configuration defining an assembly sequence; determining threshold values from the assembly sequence; assigning prefixes to entries of the delivery sequence, the prefixes being assigned based on a comparison of each entry of the entries of the delivery sequence to the threshold values; generating a formatted sequence of component identifiers by using the prefixes; and triggering an execution of a delivery of the plurality of components to the customer according to the formatted sequence of component identifiers.

In some variations, one or more features disclosed herein including the following features can optionally be included in any feasible combination. In some implementations, the delivery sequence is generated based on a production sequence of a plurality of systems. In some implementations, the threshold values define transitions between time intervals corresponding to different assembly phases of the assembly sequence. In some implementations, the delivery sequence includes groups of components corresponding to different system types. In some implementations, the operations further include: monitoring an execution of the delivery to identify a disruption; and adjusting the formatted sequence of component identifiers to compensate for the disruption. In some implementations, the entries of the delivery sequence include one or more of an alphanumeric entry, a numeric entry, and a character representation. In some implementations, the entries of the delivery sequence are generated based on a configurable set of rules.

In another aspect, a system includes: at least one data processor; and at least one memory storing instructions, which when executed by the at least one data processor, cause operations including: receiving a delivery sequence including a plurality of component identifiers defining a delivery order for a plurality of components for a customer; retrieving an assembly configuration of the customer, the assembly configuration defining an assembly sequence; determining threshold values from the assembly sequence; assigning prefixes to entries of the delivery sequence, the prefixes being assigned based on a comparison of each entry of the entries of the delivery sequence to the threshold values; generating a formatted sequence of component identifiers by using the prefixes; and triggering an execution of a delivery of the plurality of components to the customer according to the formatted sequence of component identifiers.

In some variations, one or more features disclosed herein including the following features can optionally be included in any feasible combination. In some implementations, the delivery sequence is generated based on a production sequence of a plurality of systems. In some implementations, the threshold values define transitions between time intervals corresponding to different assembly phases of the assembly sequence. In some implementations, the delivery sequence includes groups of components corresponding to different system types. In some implementations, the operations further include: monitoring an execution of the delivery to identify a disruption; and adjusting the formatted sequence of component identifiers to compensate for the disruption. In some implementations, the entries of the delivery sequence include one or more of an alphanumeric entry, a numeric entry, and a character representation. In some implementations, the entries of the delivery sequence are generated based on a configurable set of rules.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that can include one or more processors and one or more memories coupled to the one or more processors. A memory, which can include a non-transitory computer-readable or machine-readable storage medium, can include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to customization of database tables, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2B depicts an example of a delivery sequence record, in accordance with some example implementations;

Figure 1:
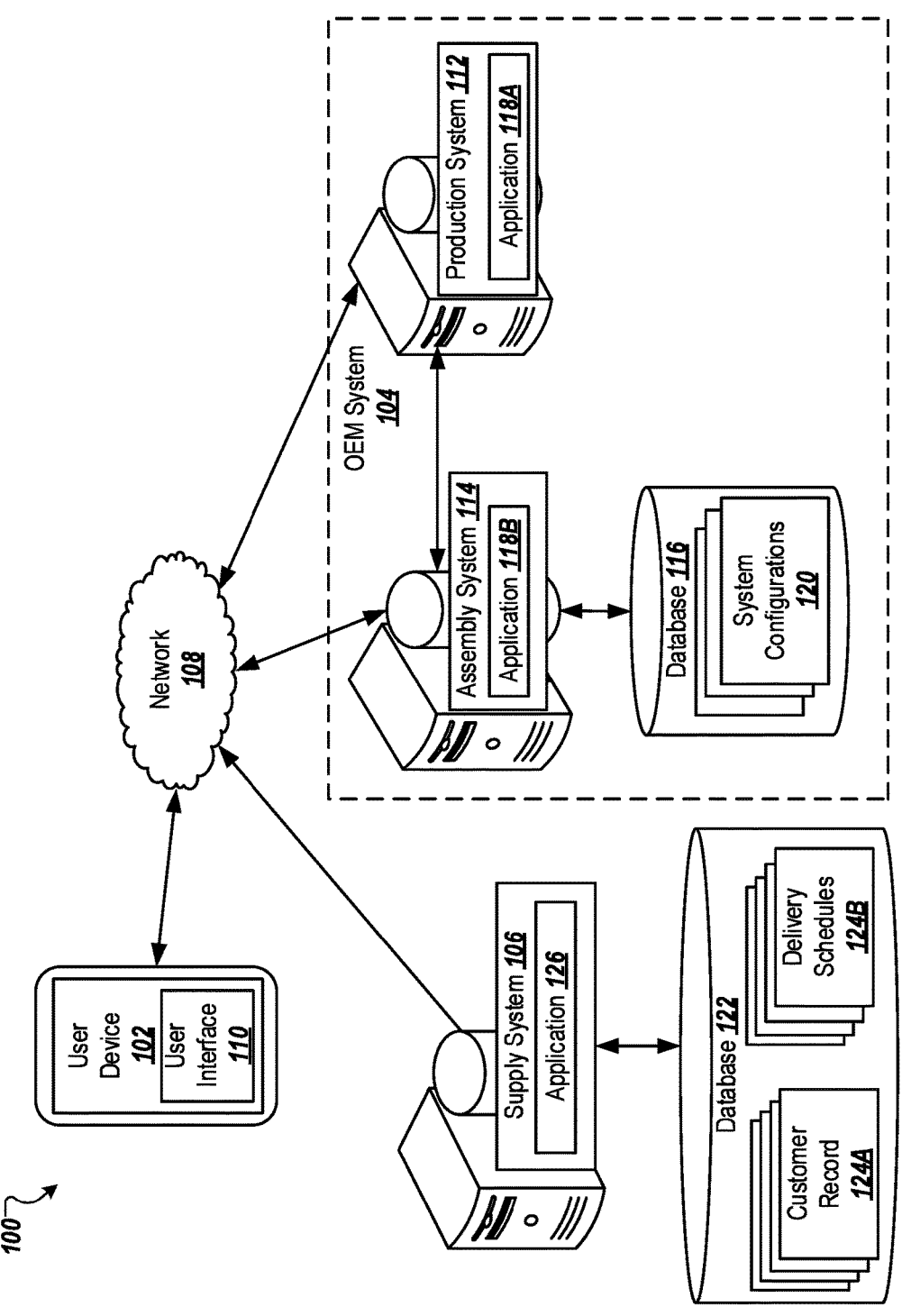
FIG. 1 depicts a diagram illustrating an example of a system, in accordance with some example implementations.

When practical, like labels are used to refer to same or similar items in the drawings.

DETAILED DESCRIPTION

Implementations of the present disclosure are generally directed to production sequencing. More particularly, implementations of the present disclosure are directed to managing a sequence mechanism for system assembly by an original equipment manufacturer (OEM). OEMs receive orders for systems (e.g., vehicles, computing devices, industrial systems, furniture) that are manufactured from multiple components. The manufacturing process can include an assembly of the components in a particular order during a planned time period including multiple assembly phases. The OEM can generate a component delivery sequence that can enable efficient component assembly operations to manufacture the ordered systems. The transmission of the component delivery sequence, to a supply system, can introduce a rearrangement of one or more component identifiers. The supply system can reorder the sequence using a delivery order configuration of the OEM and one or more threshold values defining assembly transitions between assembly phases. The supply system can control a delivery of components, to an assembly system of the OEM, using the reordered sequence.

The described implementations herein avoid the drawbacks of sequence transmission disruptions, such as missing parts. Sequence transmission disruptions could disable an assembly process of an ordered system (e.g., an industrial machine, a vehicle, a computing system, or any other type of an electronic device) that can only be assembled using respective parts in a set sequence. To prevent failed delivery of one or more components, the described systems use a formatted sequence. The formatted sequence reorders the transmitted sequence using a delivery order configuration of the OEM and one or more threshold values defining assembly transitions between assembly phases that can enable a synchronization between an original component assembly plan and a component delivery order. The described implementations provide a computationally efficient correction of delivery sequence errors introduced by the transmission protocols of the delivery sequence, optimizing component delivery to activate integration of system components during allocated phases of an assembly process of the ordered system. The described implementations improve the OEM systems and/or supply systems by minimizing repeated requests, which decreases CPU processing demands and network resources, enabling the respective systems to handle more transactions.

FIG. 1 depicts an example of a system 100, in accordance with some example implementations. Referring to FIG. 1, the example system 100 includes a user device 102, an OEM system 104, a supply system 106, and a network 108.

The user device 102 can interact with the OEM system 104 to access cloud-based software applications that enable visualization of a system assembly status for a system (e.g., vehicle, computing device, industrial system, furniture or any other system including multiple components) ordered to be manufactured, by the OEM system 104. The user interface 110 can enable an entry of a user input including an order of the system including customization of the system planned to include selected features. The user device 102 can transmit the order of the system including the selected features to the OEM system 104. The user device 102 can receive notifications from the OEM system 104 including a manufacturing status of the ordered system. The user interface 110 can display the notifications indicating the manufacturing status of the ordered system.

The user device 102 can be and/or include any type of processor and memory based device, such as, for example, cellular phones, smart phones, tablet computers, laptop computers, desktop computers, workstations, personal digital assistants (PDA), network appliances, cameras, enhanced general packet radio service (EGPRS) mobile phones, media players, navigation devices, email devices, game consoles, or an appropriate combination of any two or more of these devices or other data processing devices. The user device 102 can include any combination of fixed and variable computing components. Even though, not illustrated, in some implementations, multiple user devices 102 including different computing system configurations, such as different operating systems, different processing capabilities, different hardware components, and/or other differences can concurrently request updates regarding the manufacturing status of the ordered system, including updates associated with component delivery, from the OEM system 104 and the supply system 106.

As shown in FIG. 1, the user device 102, the OEM system 104, and the supply system 106 can be communicatively coupled, via the network 108 to enable data transmission. It should be appreciated that the network 108 can be any wired and/or wireless network including, for example, a public land mobile network (PLMN), a local area network (LAN), a wide area network (WAN), the Internet, a cellular network, a telephone network (e.g., PSTN) or an appropriate combination thereof connecting any number of communication devices, mobile computing devices, fixed computing devices, server systems, and/or the like.

The OEM system 104 can include any form of servers including, but not limited to a web server (e.g., cloud-based server), an application server, a proxy server, a network server, and/or a server pool. In general, the OEM system 104 can include a production system 112 an assembly system 114 and a database 116 to manage manufacture of ordered (customized) systems. The OEM system 104 can be configured to provide access to cloud-based software applications 118A, 118B for system customization services and system assembly services to any number of user devices (e.g., the user device 102) over the network 108.

As shown in FIG. 1, the OEM system 104 can host the production system 112 to manage orders of new systems to be manufactured by the assembly system 114. For instance, the production system 112 can provide access to cloud-based software applications 118A to manage orders of new systems. The cloud-based software application 118A can be a system customization application that enables a user to select a system model and customize the selected model to include one or more particular features from a list of features that can be added to the system by the assembly system 114. It should be appreciated that the cloud-based software application 118A can be any cloud-based software application. In some example implementations, the production system 112 can process received orders for customized systems and generate a set of system manufacturing orders for the assembly system 114.

The assembly system 114 can process the system manufacturing orders, received from the production system 112, to generate a production sequence. The production sequence can define an order in which system components are planned to be used to assemble the ordered customized systems. In some example implementations, the assembly system 114 can process the system manufacturing orders by using component data defined by system configurations 120 stored in the database 116. The assembly system 114 can cloud-based software application 118B to create and update system configurations 120 to optimize simultaneous assembly of multiple systems. For example, the cloud-based software application 118B can be used to create, retrieve, update, and/or delete data from one or more system configurations 120.

The assembly system 114 can transmit the production sequence to the supply system(s) 106. The production sequence can be transmitted using a particular data transmission protocol, such as electronic data interchange (EDI) messages. The supply system(s) 106 can be configured to process the production sequence to generate a delivery sequence by data retrieved from a database 122, such as customer records 124A and delivery schedules 124B.

As shown in FIG. 1, supply system(s) 106 can provide access to a cloud-based software application 126 that can operate on data in the customer records 124A and the delivery schedules 124B stored in the database 122. For example, the cloud-based software application 126 can enable a user to manage and/or update the customer records 124A stored in the database 122, which can define a user's assembly plan including assembly phases.

The database 122 can be configured to store the customer records 124A and the delivery schedules 124B. The database 122 can include a multitenant database architecture (e.g., multitenant database containers (MDC)), such that each tenant of the supply system 106 (using a respective user device 102) can customize respective customer records 124A stored by the database 122 and can be served by separate instances of the supply system 106 when using cloud-based software applications 126.

The databases 116, 122 can include a cloud database system environment, such as, Analytics Cloud (SAC) Data Warehouse Cloud or High performance Analytic Appliance (HANA), as available from SAP AG, Walldorf, Germany although other types of databases can be used as well. In some implementations, the databases 116, 122 can include an on-premise database system (e.g., system databases, tenant databases, etc.), servers (e.g., name server(s), index server(s), script server(s), etc.). The databases 116, 122 can store data (system configurations 120, customer records 124A and delivery schedules 124B) that can be accessible (e.g., via queries, procedure calls, etc.) by the user device 102, and by cloud-based software applications 118A, 118B, 126. The database 122 can include a runtime database that holds most recent delivery schedules 124B and respective component delivery updates to enable just in sequence delivery of components for system assembly. The management of the sequencing mechanism is further described in detail with reference to FIGS. 2 and 3.

Figure 2A:
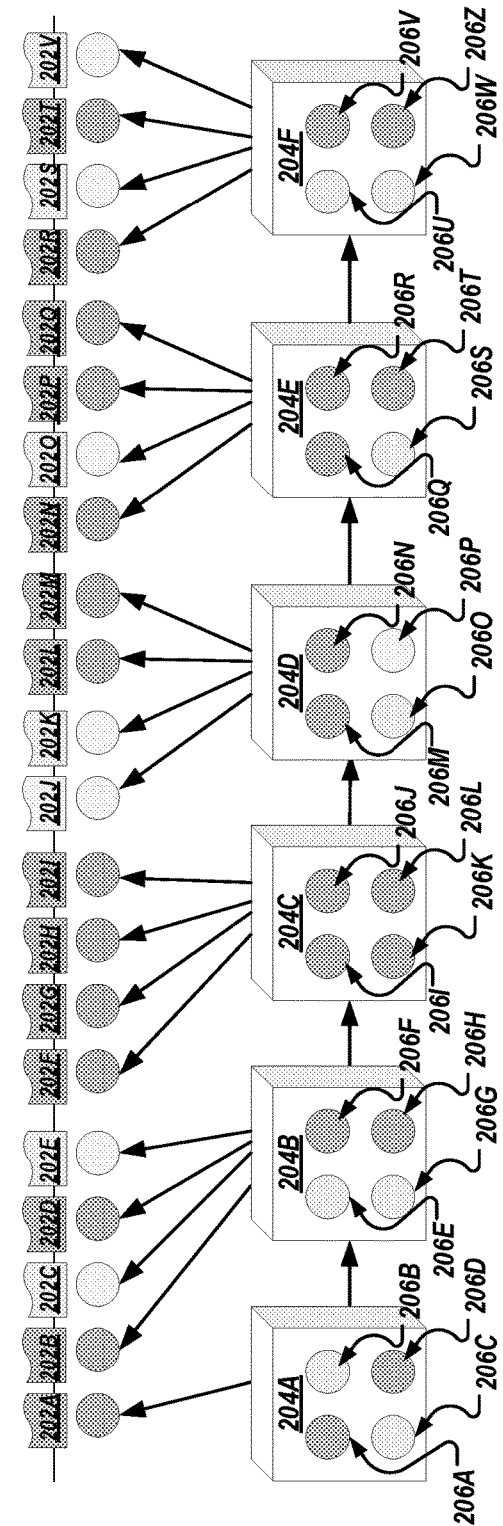
FIG. 2A depicts an example of a sequencing mechanism, in accordance with some example implementations.

FIG. 2A depicts a block diagram illustrating an example of a delivery sequence generation 200, in accordance with some example implementations. The delivery sequence generation 200 can be executed by one or more server systems, such as OEM system 104 described with reference to FIG. 1. The delivery sequence generation 200 can include a production sequence 202A-202V generated by a production system (e.g., the production system 112 described with reference to FIG. 1) and a delivery sequence 204A-204F generated by an assembly system (e.g., assembly system 114 described with reference to FIG. 1).

As illustrated in FIG. 2A, the delivery sequence 204A-204F generated by an assembly system can be based on orders to be delivered to the end customers according to the production sequence 202A-202V. The delivery sequence 204A-204F can include multiple packages 204A, 204B, 204C, 204D, 204E, 204F (package units or handling units) arranged in an order matching the ordered systems included in the production sequence 202A-202V. Each package of the packages 204A, 204B, 204C, 204D, 204E, 204F includes multiple components (e.g., components 206A-206D) forming the ordered systems included in the production sequence 202A-202V. The delivery sequence 204A-204F can define sequencing for both packages and components 206A-206Z. For example, the delivery sequence 204A-204F can define sequencing for delivering the packages to the OEM systems to enable receipt of the system components 206A-206Z in the requested sequence.

The production sequence 202A-202V can include coding (e.g., colour coding) to classify systems ordered to be produces, such as to mark system (e.g., vehicle) models of a particular type. The coding included in the production sequence 202A-202V can be included in the delivery sequence 204A-204F. For example, the delivery sequence 204A-204F can include (color) coding to mark the components used to assemble the ordered system (vehicle) models. In some implementations, a similar sequencing can be followed by both the OEM system and supply systems to reduce the inventory of the OEM system and make the system assembly process efficient in terms of delivering the components from the supply system to the OEM system. Further details regarding the sequencing process performed by the OEM and supply systems are described with reference to FIG. 3.

FIG. 2B illustrates an example of a delivery sequence record 220 as processed by a supply system (e.g., supply system 106 described with reference to FIG. 1). The example delivery sequence record 220 includes delivery sequence 222 received from OEM, assignment ranges 224, prefixes assignment 226, reasoning 228, a formatted sequence 230, assembly details 232, assembly ranges 234, and assembly range initials 236. The delivery sequence record 220 can include multiple entries (component identifiers) that can be rearranged due to a transmission protocol, such that the sequence 222 received from OEM is different (as order of entries) from a production sequence intended to be used by the OEM system.

For example, the first entry (001) of the sequence 222 that is received by the supplier can be considered as the start of the system assembly process, if it corresponds to a minimum value of a beginning range. Subsequent entries (component identifiers), such as 002, 003 and so on till 994 can be considered in an orderly manner, assuming that 001 till 994 were received in the orderly manner without any gaps. The entry (component identifier) received by the supplier (e.g., using a JIT call), after entry 994, can be entry 003 that can be identified, by the supply system, as part of a next assembly phase, the entry 003 being already processed for the current assembly phase (beginning range). The distinction of sequence numbers across assembly phases can be used to assign correct assembly phases 224 to the numerical entries of the delivery sequence 222 of the delivery sequence, to assign prefixes 226 according to a reason 228 that can be added to the delivery sequence record 220. After processing entry 003, entry 004 can be processed by the supply system, which is also identified as a part of next assembly phase since sequence number 004 of current assembly phase is already processed. After entry 004, entry 994 can be processed by the supply system, which can be considered as part of a current assembly phase (beginning range). Similarly, 995 and 996 can be processed as sequence numbers belonging to current assembly phase (beginning range).

Using the assignment of the correct ranges 224 to the received delivery sequence 222 (component identifiers) and the assignment of prefixes 226, the formatted sequence 230 can be generated by the supply system. The formatted sequence 230 can include multiple entries (formatted component identifiers that include the matching prefixes) ordered according to a predicted sequential order of assembly phases, identified by the assembly details 232 (delivery sequence profile corresponding to a particular OEM system)

and corresponding to the component identifier ranges 234 of the respective OEM system. The formatted sequence 230 can be used by the supply system to deliver the ordered components, described with reference to FIG. 3.

Figure 3:
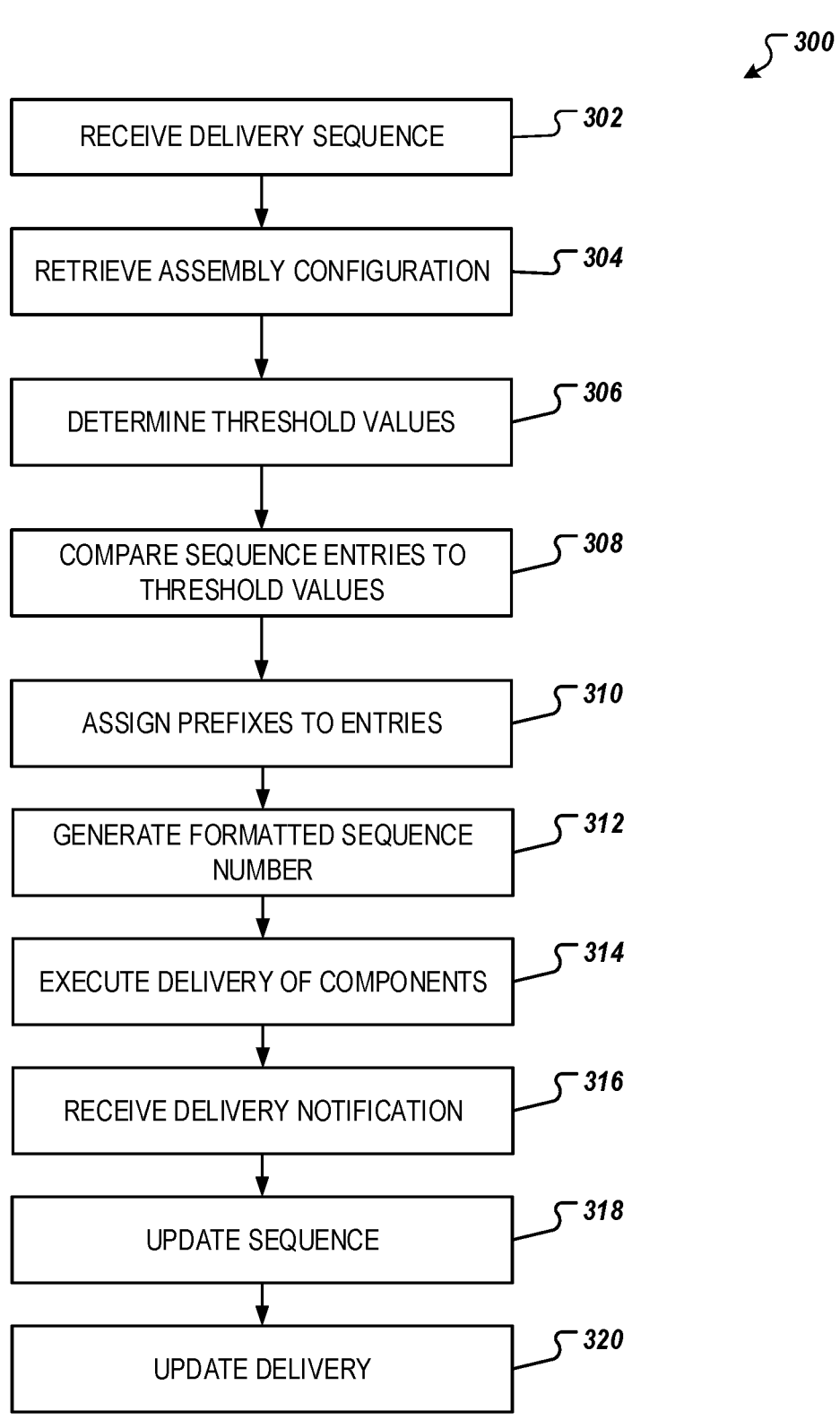
FIG. 3 depicts a process for customizing database tables, in accordance with some example implementations.

FIG. 3 depicts a flowchart illustrating a process 300 for managing a sequence mechanism in accordance with some example implementations. The process 300 can be executed by the system 100 shown in FIG. 1, using a sequencing mechanism 200 shown in FIG. 2A, and/or the system 400 shown in FIG. 4 or any combination thereof.

At 302, a delivery sequence is received by a supply system (e.g., supply system 106 described with reference to FIG. 1), from an OEM system (e.g., OEM system 104 described with reference to FIG. 1). In some implementations, the delivery sequence is transmitted via Electronic Data Interchange (EDI) messages with sequence numbers (based on customer production plan), which may not always come in the same order of request due to bottlenecks in logistics and production execution. The delivery sequence can be transmitted with an identifier OEM system (customer) such that the delivery sequence can be mapped to a particular customer issuing the request for system components.

The delivery sequence can include multiple entries, each entry including one component identifier or multiple grouped component identifiers. The component identifiers can include one or more of an alphanumeric string, a numeric string, and a character representation that can be formatted according to an OEM system (customer) setting. For example, a first customer can use alphanumeric or numeric strings as component identifiers and a second customer can use a textual description (name) for the components as component identifiers.

In some implementations, the component identifiers can include additional information, such as number of components, an expected delivery date (represented according to a given format), a delivery location and/or component grouping information. For example, an entry can include a string formatted to include a component name and date (DD-MM-YYYY HH:MM:SS), represented as "engine275-31-12-2022 10:00:02." The sequence of component identifiers forming the delivery sequence can define a delivery order for system components planned to be used by the OEM system (customer) for assembling one or more system types, according to a production sequence (as described with reference to FIG. 2A). In some implementations, the delivery sequence can include a coding of the system type that is associated to each component identifier (e.g., sequencing mechanism 200 described with reference to FIG. 2A).

At 304, customer records including an assembly configuration of the customer can be retrieved from a database (e.g., database 122 described with reference to FIG. 1). The customer records are associated with a respective customer. The customer records can be retrieved (using the customer identifier) each time a delivery sequence is received. The customer records can include rules that can be applied to process the component identifiers to generate a numerical representation of the received delivery sequence (e.g., delivery sequence 222 described with reference to FIG. 2B). The assembly configuration can define an assembly sequence including multiple assembly phases (e.g., beginning range, mid-range, and end range) and ranges of component identifiers (e.g., 001-199, 200-799, 800-999) corresponding to each assembly phase.

At 306, threshold values are extracted from the assembly sequence. For example, the ranges of component identifiers are mapped to corresponding assembly phases to extract the initial value and the final value of each component identifier range. The initial values and the final values of the component identifier ranges can be used as threshold (numerical) values to mark transition between different assembly phases.

At 308, each component identifier is compared to the threshold values, relative to its location in the delivery sequence to identify a corresponding assembly phase. For example, the distinction of sequence numbers across assembly phases can be used to assign corresponding assembly phases to the numerical entries of the delivery sequence. In some implementations, a repetition of a component identifier before the entries reach a threshold value (final value of a component identifier range corresponding to an assembly phase) is processed as an indication of an entry corresponding to a subsequent assembly phase. In some implementations, component identifier(s) missing from a first range and appearing as duplicates in a second range can also be allocated to corresponding ranges to correct the missing entry of the first range.

At 310, prefixes are assigned to the entries of the delivery sequence. The prefixes can include a numerical string with different values corresponding to the different assembly phases. For example, if a particular number of assembly phases are included in an assembly configuration corresponding to a customer, the same number of different prefixes can be used to be assigned to the entries of the delivery sequence.

At 312, a formatted sequence of component identifiers is generated by adding the prefixes to the front of the entries of the delivery sequence. The formatted sequence of component identifiers can include a sequence of numerical values that can be ordered to match the planned assembly of the ordered systems of the production sequence. In some implementations, the formatted sequence of component identifiers can be aligned with a timeline such that components grouped within particular ranges corresponding to different assembly phases are assigned a particular time period for delivery.

At 314, the formatted sequence of component identifiers can be processed to execute delivery of one or more groups of components. For example, the components grouped within particular ranges corresponding to different assembly phases that are assigned to a particular time period can be delivered simultaneously or can be scheduled to enable successful delivery within a respective time period.

At 316, a delivery notification can be received from the OEM system. The delivery notification can be generated, by the OEM system, in response to component receipt, indicate a successful delivery of the system components. In some implementations, the delivery notification can be generated, by the OEM system, in response to failure to receive one or more components within an expected component delivery time.

At 318, if one or more components failed to be delivered, the component delivery sequence can be updated to correct the failed delivery. In some implementations, if the expected component delivery does not match the formatted sequence of component identifiers, one or more rules to process the delivery sequence can be updated to prevent future delivery failures.

At 320, the delivery can be updated to prioritize delivery of the system components associated with the failed delivery. The component delivery adjustment can enable timely correction of delivery failures to complete delivery of components used for an assembly phase and, ultimately, complete assembly process.

The example process 300 enables a computationally efficient correction of delivery sequence errors introduced by the transmission protocols of the delivery sequence. Using the example process 300, supply systems can automatically correct and configure delivery sequences according to the assembly protocols used by different customers (OEM systems. The formatting of delivery sequences, enables integration of system components during allocated assembly phases, minimizing storage system components, and optimizing assembly processes.

Figure 4:
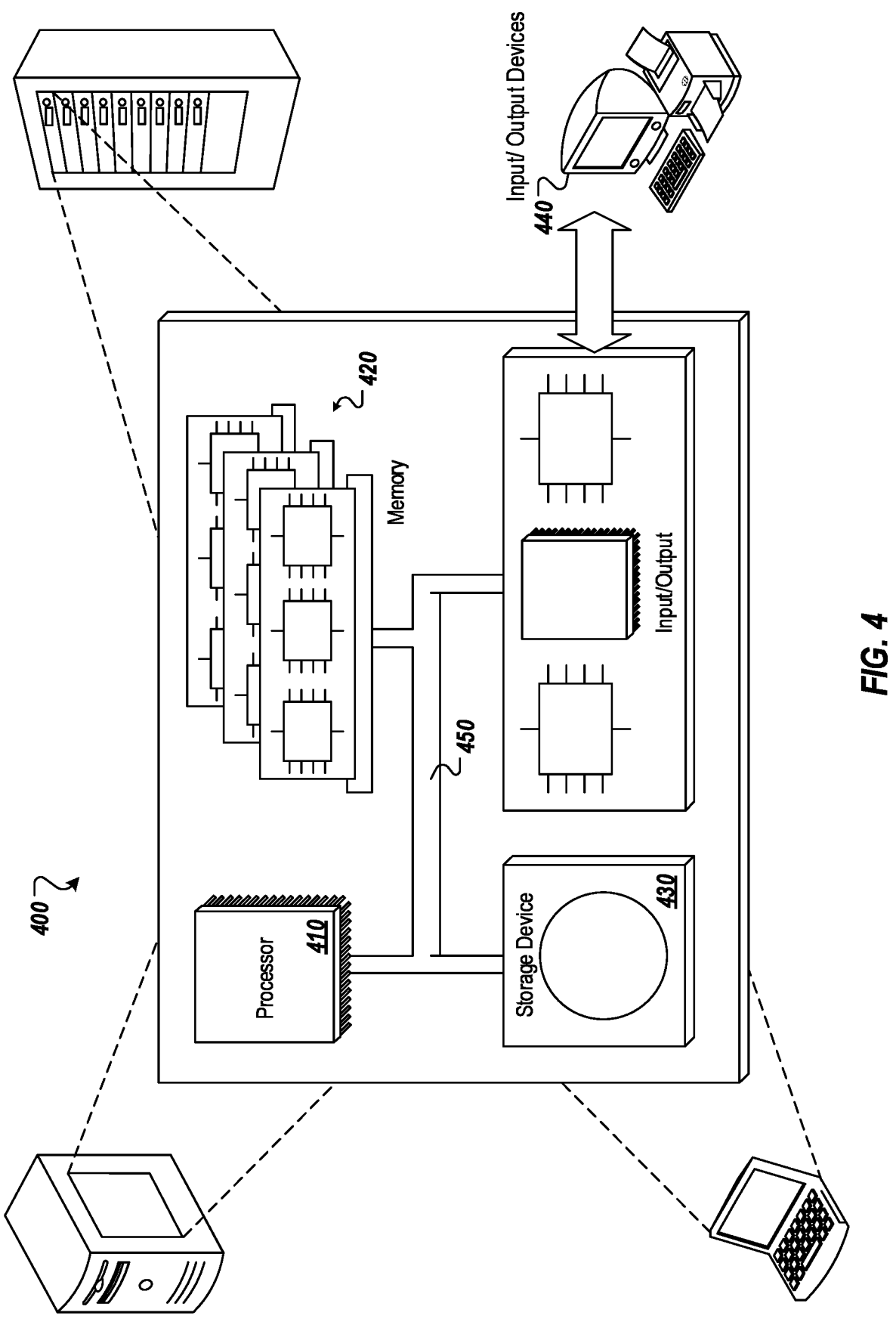
FIG. 4 depicts a diagram illustrating a computing system, in accordance with some example implementations.

In some implementations, the current subject matter can be configured to be implemented in a system 400, as shown in FIG. 4. The system 400 can include a processor 410, a memory 420, a storage device 430, and an input/output device 440. Each of the components 410, 420, 430 and 440 can be interconnected using a system bus 450. The processor 410 can be configured to process instructions for execution within the system 400. In some implementations, the processor 410 can be a single-threaded processor. In alternate implementations, the processor 410 can be a multi-threaded processor. The processor 410 can be further configured to process instructions stored in the memory 420 or on the storage device 430, including receiving or sending information through the input/output device 440. The memory 420 can store information within the system 400. In some implementations, the memory 420 can be a computer-readable medium. In alternate implementations, the memory 420 can be a volatile memory unit. In yet some implementations, the memory 420 can be a non-volatile memory unit. The storage device 430 can be capable of providing mass storage for the system 400. In some implementations, the storage device 430 can be a computer-readable medium. In alternate implementations, the storage device 430 can be a floppy disk device, a hard disk device, an optical disk device, a tape device, non-volatile solid state memory, or any other type of storage device. The input/output device 440 can be configured to provide input/output operations for the system 400. In some implementations, the input/output device 440 can include a keyboard and/or pointing device. In alternate implementations, the input/output device 440 can include a display unit for displaying graphical user interfaces.

In some implementations, one or more application function libraries in the plurality of application function libraries can be stored in the one or more tables as binary large objects. Further, a structured query language can be used to query the storage location storing the application function library.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more user device computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include user devices and servers. A user device and server are generally, but not exclusively, remote from each other and typically interact through a communication network. The relationship of user device and server arises by virtue of computer programs running on the respective computers and having a user device-server relationship to each other.

Further non-limiting aspects or implementations are set forth in the following numbered examples:

Example 1: A computer-implemented method comprising: receiving, by one or more processors, a delivery sequence comprising a plurality of component identifiers defining a delivery order for a plurality of components for a customer; retrieving, by the one or more processors, an assembly configuration of the customer, the assembly configuration defining an assembly sequence; determining, by the one or more processors, threshold values from the assembly sequence; assigning, by the one or more processors, prefixes to entries of the delivery sequence, the prefixes being assigned based on a comparison of each entry of the entries of the delivery sequence to the threshold values; generating, by the one or more processors, a formatted sequence of component identifiers by using the prefixes; and triggering, by the one or more processors, an execution of a delivery of the plurality of components to the customer according to the formatted sequence of component identifiers.

Example 2: The computer-implemented method of example 1, wherein the delivery sequence is generated based on a production sequence of a plurality of systems.

Example 3: The computer-implemented method of any one of the preceding examples, wherein the threshold values define transitions between time intervals corresponding to different assembly phases of the assembly sequence.

Example 4: The computer-implemented method of any one of the preceding examples, wherein the delivery sequence comprises groups of components corresponding to different system types.

Example 5: The computer-implemented method of any one of the preceding examples, further comprising: monitoring an execution of the delivery to identify a disruption; and adjusting the formatted sequence of component identifiers to compensate for the disruption.

Example 6: The computer-implemented method of any one of the preceding examples, wherein the entries of the delivery sequence comprise one or more of an alphanumeric entry, a numeric entry, and a character representation.

Example 7: The computer-implemented method of any one of the preceding examples, wherein the entries of the delivery sequence are generated based on a configurable set of rules.

Example 8: A non-transitory computer-readable storage medium comprising programming code, which when executed by at least one data processor, causes operations comprising: receiving a delivery sequence comprising a plurality of component identifiers defining a delivery order for a plurality of components for a customer; retrieving an assembly configuration of the customer, the assembly configuration defining an assembly sequence; determining threshold values from the assembly sequence; assigning prefixes to entries of the delivery sequence, the prefixes being assigned based on a comparison of each entry of the entries of the delivery sequence to the threshold values; generating a formatted sequence of component identifiers by using the prefixes; and triggering an execution of a delivery of the plurality of components to the customer according to the formatted sequence of component identifiers.

Example 9: The non-transitory computer-readable storage medium of example 8, wherein the delivery sequence is generated based on a production sequence of a plurality of systems.

Example 10: The non-transitory computer-readable storage medium of any one of the preceding examples, wherein the threshold values define transitions between time intervals corresponding to different assembly phases of the assembly sequence.

Example 11: The non-transitory computer-readable storage medium of any one of the preceding examples, wherein the delivery sequence comprises groups of components corresponding to different system types.

Example 12: The non-transitory computer-readable storage medium of any one of the preceding examples, wherein the operations further comprise: monitoring an execution of the delivery to identify a disruption; and adjusting the formatted sequence of component identifiers to compensate for the disruption.

Example 13: The non-transitory computer-readable storage medium of any one of the preceding examples, wherein the entries of the delivery sequence comprise one or more of an alphanumeric entry, a numeric entry, and a character representation.

Example 14: The non-transitory computer-readable storage medium of any one of the preceding examples, wherein the entries of the delivery sequence are generated based on a configurable set of rules.

Example 15: A system comprising: at least one data processor; and at least one memory storing instructions, which when executed by the at least one data processor, cause operations comprising: receiving a delivery sequence comprising a plurality of component identifiers defining a delivery order for a plurality of components for a customer; retrieving an assembly configuration of the customer, the assembly configuration defining an assembly sequence; determining threshold values from the assembly sequence; assigning prefixes to entries of the delivery sequence, the prefixes being assigned based on a comparison of each entry of the entries of the delivery sequence to the threshold values; generating a formatted sequence of component identifiers by using the prefixes; and triggering an execution of a delivery of the plurality of components to the customer according to the formatted sequence of component identifiers.

Example 16: The system of example 15, wherein the delivery sequence is generated based on a production sequence of a plurality of systems.

Example 17: The system of any one of the preceding examples, wherein the threshold values define transitions between time intervals corresponding to different assembly phases of the assembly sequence.

Example 18: The system of any one of the preceding examples, wherein the delivery sequence comprises groups of components corresponding to different system types.

Example 19: The system of any one of the preceding examples, wherein the operations further comprise: monitoring an execution of the delivery to identify a disruption; and adjusting the formatted sequence of component identifiers to compensate for the disruption.

Example 20: The system of any one of the preceding examples, wherein the entries of the delivery sequence comprise one or more of an alphanumeric entry, a numeric entry, and a character representation and wherein the entries of the delivery sequence are generated based on a configurable set of rules.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. For example, the logic flows can include different and/or additional operations than shown without departing from the scope of the present disclosure. One or more operations of the logic flows can be repeated and/or omitted without departing from the scope of the present disclosure. Other implementations can be within the scope of the following claims.

What is claimed is:

1. A computer-implemented method comprising:

receiving, by one or more processors of a supply system and from an original equipment manufacturer (OEM) system server associated with an OEM, a delivery sequence comprising a plurality of component identifiers defining a delivery order for a plurality of components for the OBM, wherein the delivery sequence is transmitted from the OEM system server to the supply system using a data transmission protocol comprising electronic data interchange (EDI) messages, and wherein the transmission of the EDI messages introduces an error in the delivery sequence by rearranging one or more of the component identifiers;

retrieving, by the one or more processors, an assembly configuration of the OEM, the assembly configuration defining an assembly sequence;

determining, by the one or more processors, threshold values from the assembly sequence;

assigning, by the one or more processors, prefixes to entries of the delivery sequence, the prefixes being assigned based on a comparison of each entry of the entries of the delivery sequence to the threshold values;

generating, by the one or more processors, a formatted sequence of component identifiers by using the prefixes, wherein the formatted sequence of component identifiers corrects the error in the delivery sequence introduced by the transmission of the EDI messages; and triggering, by the one or more processors, an execution of a delivery of the plurality of components to the OEM according to the formatted sequence of component identifiers.

2. The computer-implemented method of claim 1, wherein the assembly configuration is retrieved from a database of the supply system that stores OEM records, the database comprising a multitenant database architecture to implement separate instances of the supply system, each of which serving different tenants of the supply system.

3. The computer-implemented method of claim 1, wherein the delivery sequence is generated by an assembly system of the OEM system server based on a production sequence of a plurality of systems generated by a production system of the OEM system server, and wherein the supply system is external to the OEM system server.

4. The computer-implemented method of claim 1, wherein the delivery sequence comprises groups of components corresponding to different system types.

5. The computer-implemented method of claim 1, further comprising:
monitoring an execution of the delivery to identify a disruption; and
adjusting the formatted sequence of component identifiers to compensate for the disruption.

6. The computer-implemented method of claim 1, wherein the entries of the delivery sequence comprise one or more of an alphanumeric entry, a numeric entry, and a character representation.

7. The computer-implemented method of claim 1, wherein the entries of the delivery sequence are generated based on a configurable set of rules.

8. A non-transitory computer-readable storage medium comprising programming code, which when executed by at least one data processor, causes operations comprising:
receiving, at a supply system and from an original equipment manufacturer (OEM) system server associated with an OFM, a delivery sequence comprising a plurality of component identifiers defining a delivery order for a plurality of components for the OEM, wherein the delivery sequence is transmitted from the OEM system server to the supply system using a data transmission protocol comprising electronic data interchange (EDI) messages, and wherein the transmission of the EDI messages introduces an error in the delivery sequence by rearranging one or more of the component identifiers;
retrieving an assembly configuration of the OEM, the assembly configuration defining an assembly sequence;
determining threshold values from the assembly sequence;
assigning prefixes to entries of the delivery sequence, the prefixes being assigned based on a comparison of each entry of the entries of the delivery sequence to the threshold values;
generating a formatted sequence of component identifiers by using the prefixes, wherein the formatted sequence of component identifiers corrects the error in the delivery sequence introduced by the transmission of the EDI messages; and
triggering an execution of a delivery of the plurality of components to the OEM according to the formatted sequence of component identifiers.

9. The non-transitory computer-readable storage medium of claim 8, wherein the delivery sequence is generated based on a production sequence of a plurality of systems.

10. The non-transitory computer-readable storage medium of claim 8, wherein the threshold values define transitions between time intervals corresponding to different assembly phases of the assembly sequence.

11. The non-transitory computer-readable storage medium of claim 8, wherein the delivery sequence comprises groups of components corresponding to different system types.

12. The non-transitory computer-readable storage medium of claim 8, wherein the operations further comprise:

monitoring an execution of the delivery to identify a disruption; and
adjusting the formatted sequence of component identifiers to compensate for the disruption.

13. The non-transitory computer-readable storage medium of claim 8, wherein the entries of the delivery sequence comprise one or more of an alphanumeric entry, a numeric entry, and a character representation.

14. The non-transitory computer-readable storage medium of claim 8, wherein the entries of the delivery sequence are generated based on a configurable set of rules.

15. A system comprising:
at least one data processor; and
at least one memory storing instructions, which when executed by the at least one data processor, cause operations comprising:
receiving, at a supply system and from an original equipment manufacturer (OEM) system server associated with an OEM, a delivery sequence comprising a plurality of component identifiers defining a delivery order for a plurality of components for the OEM, wherein the delivery sequence is transmitted from the OEM system server to the supply system using a data transmission protocol comprising electronic data interchange (EDD) messages, and wherein the transmission of the EDI messages introduces an error in the delivery sequence by rearranging one or more of the component identifiers;
retrieving an assembly configuration of the OEM, the assembly configuration defining an assembly sequence;
determining threshold values from the assembly sequence;
assigning prefixes to entries of the delivery sequence, the prefixes being assigned based on a comparison of each entry of the entries of the delivery sequence to the threshold values;
generating a formatted sequence of component identifiers by using the prefixes, wherein the formatted sequence of component identifiers corrects the error in the delivery sequence introduced by the transmission of the EDI messages; and
triggering an execution of a delivery of the plurality of components to the OEM according to the formatted sequence of component identifiers.

16. The system of claim 15, wherein the delivery sequence is generated based on a production sequence of a plurality of systems.

17. The system of claim 15, wherein the threshold values define transitions between time intervals corresponding to different assembly phases of the assembly sequence.

18. The system of claim 15, wherein the delivery sequence comprises groups of components corresponding to different system types.

19. The system of claim 15, wherein the operations further comprise:
monitoring an execution of the delivery to identify a disruption; and
adjusting the formatted sequence of component identifiers to compensate for the disruption.

20. The system of claim 15, wherein the entries of the delivery sequence comprise one or more of an alphanumeric entry, a numeric entry, and a character representation and wherein the entries of the delivery sequence are generated based on a configurable set of rules.

* * * * *